United States Patent
Wang et al.

(10) Patent No.: US 10,873,799 B2
(45) Date of Patent: Dec. 22, 2020

(54) HEADSET ELECTRONIC DEVICE AND HEADBAND ADJUSTMENT STRUCTURE THEREOF

(71) Applicant: Quanta Computer Inc., Taoyuan (TW)

(72) Inventors: Chun-Wen Wang, Taoyuan (TW); Ko-Chun Wang, Taoyuan (TW); Chao Chien, Taoyuan (TW); Kok-Kan Chan, Taoyuan (TW); Chien-Yu Hou, Taoyuan (TW); Chun-Lung Chen, Taoyuan (TW)

(73) Assignee: Quanta Computer Inc., Taoyuan (TW)

( * ) Notice: Subject to any disclaimer, the term of this patent is extended or adjusted under 35 U.S.C. 154(b) by 0 days.

(21) Appl. No.: 16/388,235

(22) Filed: Apr. 18, 2019

(65) Prior Publication Data

US 2020/0213708 A1    Jul. 2, 2020

(30) Foreign Application Priority Data

Dec. 27, 2018  (TW) .............................. 107147517 A

(51) Int. Cl.
  *H04R 1/06*   (2006.01)
  *H04R 1/10*   (2006.01)
  *H04R 1/02*   (2006.01)

(52) U.S. Cl.
  CPC .......... *H04R 1/1066* (2013.01); *H04R 1/028* (2013.01); *H04R 1/105* (2013.01); *H04R 1/1033* (2013.01)

(58) Field of Classification Search
  CPC ...... H04R 1/06; H04R 1/1033; H04R 1/1088; H04R 5/0335; G02B 27/017; G02B 27/0176; A42B 3/145; Y10T 24/2187
  See application file for complete search history.

(56) References Cited

U.S. PATENT DOCUMENTS

| | | | | |
|---|---|---|---|---|
| 5,321,416 A | * | 6/1994 | Bassett | A42B 3/145 345/8 |
| 6,124,837 A | * | 9/2000 | Usuki | G02B 7/12 345/8 |
| 6,452,572 B1 | * | 9/2002 | Fan | G02B 27/017 345/7 |
| 8,170,261 B2 | * | 5/2012 | Danielson | H04R 1/1008 381/374 |

(Continued)

FOREIGN PATENT DOCUMENTS

WO    WO-2019100081 A2  *  5/2019  ........... H04R 5/0335

*Primary Examiner* — Fan S Tsang
*Assistant Examiner* — Ryan Robinson

(57) ABSTRACT

A headband adjustment structure includes a rotary adjusting assembly, a wearing unit having an adjustable accommodation space, a cable management module located between the wearing unit and the rotary adjusting assembly for carrying a cable, an adjustment gear set linkably coupled to the cable management module, and a driving rotation shaft set passing through the wearing unit and the cable management module, and linkably coupled to the wearing unit and the adjustment gear set, and coaxially connected to the rotary adjusting assembly. When the rotary adjusting assembly rotates the driving rotation shaft set, the driving rotation shaft set synchronously moves the wearing unit to adjust the adjustable accommodation space, and moves the cable management module through the adjustment gear set. The amount of the movement of the cable management module is different from that of the wearing unit.

9 Claims, 11 Drawing Sheets

(56) References Cited

U.S. PATENT DOCUMENTS

| | | | | |
|---|---|---|---|---|
| 8,832,869 | B2* | 9/2014 | Ma | A61H 7/006 |
| | | | | 2/418 |
| 9,021,616 | B2* | 5/2015 | Baty | A42B 3/14 |
| | | | | 2/416 |
| 9,609,415 | B2* | 3/2017 | Taylor | H04R 1/1033 |
| 10,028,049 | B2* | 7/2018 | Inoue | H04R 1/1041 |
| 10,334,343 | B2* | 6/2019 | Lu | H04R 1/1008 |
| 10,502,363 | B2* | 12/2019 | Edwards | G02B 27/017 |
| 10,630,332 | B2* | 4/2020 | Lee | H01L 43/04 |
| 2009/0211385 | A1* | 8/2009 | Fiquepron | A43C 11/14 |
| | | | | 74/422 |
| 2019/0191813 | A1* | 6/2019 | Liu | A61B 5/0205 |

* cited by examiner

HEADSET ELECTRONIC DEVICE AND HEADBAND ADJUSTMENT STRUCTURE THEREOF

RELATED APPLICATIONS

This application claims priority to Taiwan Application Serial Number 107147517, filed Dec. 27, 2018, which is herein incorporated by reference.

BACKGROUND

Field of Disclosure

The disclosure relates to a headset electronic device. More particularly, the disclosure relates to a headset electronic device having a headband adjustment structure.

Description of Related Art

With the improvement of technology, a headset electronic device for virtual reality (VR) has been launched to the marketplace. A user wearing the headset electronic device can watch a virtual world of three-dimensional space reproduced by computer simulation through the headset electronic device, and when the user turns, a new virtual-image field in the virtual world of the three-dimensional space can be instantly provided so as to enhance a real-world viewing experience of the user.

Since the present headset electronic device includes a display and a headband connected to the display, and the tightness of the headband worn on a user's head is adjustable, thus, when the user adjusts the tightness of the headband for comfort, the user has to manually adjust the tightness of the headband by himself, thus, the adjustment time to the headband is inevitably increased. In addition, when the head mounted display device is used by the user, the cables of the display often cause interference and inconvenience to the user. The result may be a situation where the user becomes unwilling to use the device due to inconvenience.

SUMMARY

In one embodiment of the disclosure, a headset electronic device and headband adjustment structure thereof are provided for solving the problems mentioned in the prior art.

In one embodiment of the disclosure, the headband adjustment structure includes a rotary adjusting assembly, a wearing unit, a cable management module, an adjustment gear set and a driving rotation shaft set. The wearing unit has an adjustable accommodation space for receiving a user's head. The cable management module is located between the wearing unit and the rotary adjusting assembly for carrying at least one cable. The adjustment gear set is linkably coupled to the cable management module. The driving rotation shaft set passes through the wearing unit and the cable management module, and is linkably coupled to the wearing unit and the adjustment gear set, and is coaxially connected to the rotary adjusting assembly. Accordingly, when the rotary adjusting assembly rotates the driving rotation shaft set, the driving rotation shaft set synchronously moves the wearing unit to adjust the adjustable accommodation space and moves the cable management module through the adjustment gear set in which the amount of movement of the cable management module is different from the amount of movement of the wearing unit.

According to one or more embodiments of the disclosure, in the headband adjustment structure, the wearing unit includes a strip body having two end portions which are opposite to and overlapped with each other. The two end portions respectively include a first toothed rack and a second toothed rack. The driving rotation shaft set includes a first gear member, a second gear member and a rotary shaft body that is coaxially coupled to the first gear member and the second gear member. The first gear member is engaged with the first toothed rack and the second toothed rack. When the rotary adjusting assembly rotates the driving rotation shaft set, the first gear member moves the two end portions of the strip body in opposite directions so as to adjust a size of the adjustable accommodation space.

According to one or more embodiments of the disclosure, in the headband adjustment structure, the rotary adjusting assembly includes a rotary button having a first engagement slot, a pressing button elevatably disposed on the rotary button, and covered on the first engagement slot, a linkage member connected to the driving rotation shaft set and the pressing button, and a position-limiting portion surrounding the linkage member to be removably engaged within the first engagement slot, and provided with a common axis line with the first engagement slot and the driving rotation shaft set, so that the rotary button is able to move the driving rotation shaft set to rotate through the position-limiting portion. When the position-limiting portion is moved away from the first engagement slot by the pressing button, the rotary button is idly rotatable relative to the driving rotation shaft set and cannot rotate the driving rotation shaft set through the position-limiting portion.

According to one or more embodiments of the disclosure, in the headband adjustment structure, the driving rotation shaft set further includes a second engagement slot, a passage and an elastic element. The second engagement slot is formed on one end surface of the rotary shaft body to accommodate the position-limiting portion therein. The position-limiting portion is engaged within the second engagement slot, and the second gear member is disposed between the second engagement slot and the first gear member. The passage is disposed on a bottom surface of the second engagement slot, and in communication with the second engagement slot. The elastic element is located within the passage and the second engagement slot to abut against the linkage member and the rotary shaft body for pushing the position-limiting portion back to the first engagement slot.

In one embodiment of the disclosure, in the headband adjustment structure, the cable management module includes a cable-loading portion and a third toothed rack disposed on the cable-loading portion. The cable-loading portion is configured to retain the cable to be curved thereon. When the rotary adjusting assembly moves the rotary shaft body to rotate collectively, the second gear member moves the cable-loading portion through the adjustment gear set.

According to one or more embodiments of the disclosure, in the headband adjustment structure, the adjustment gear set includes a rotary plate, an internal gear portion, at least one epicyclic gearing portion and an external gear portion. The rotary plate has a circular recess which is formed on one surface of the rotary plate. The second gear member is located within the circular recess. The internal gear portion is located on an inner sidewall of the circular recess. The epicyclic gearing portion is located within the circular recess to be engaged with the second gear member and the internal gear portion. The external gear portion is located on one surface of the rotary plate being opposite the circular recess, and engaged with the third toothed rack.

According to one or more embodiments of the disclosure, in the headband adjustment structure, the first gear member and the second gear member are the same in number, and the first gear member is greater than the at least one epicyclic gearing portion in number so that the amount of movement of the cable-loading portion is less than the amount of movement of the two end portions of the strip body traveling in the opposite directions.

According to one or more embodiments of the disclosure, in the headband adjustment structure, the cable-loading portion includes a frame, a plurality of first support ribs and a plurality of second support ribs. The frame has a U-shape which is provided with a long notch and an outer edge being arranged opposite to the long notch. The third toothed rack is located at a side edge of the long notch. The first support ribs are spaced arranged on the outer edge of the frame, and respectively extend away from the long notch. The second support ribs are arranged on one surface of the frame being opposite to the rotary adjusting assembly, and respectively extend towards the wearing unit. Thus, a cable receiving area for retaining the cable is defined collectively by the first supporting ribs and the second supporting ribs together.

According to one or more embodiments of the disclosure, in the headband adjustment structure, the strip body is provided with a cable-retaining portion for attaching the cable to one surface of the strip body being opposite to the cable management module along a longitudinal direction of the strip body.

According to one embodiment of the disclosure, the headset electronic device includes a display, a cable connected to the display at one end thereof, and a headband adjustment structure having a wearing unit, a cable management module, a driving rotation shaft set, a rotary adjusting assembly and an adjustment gear set. The wearing unit is connected to the display, and the wearing unit includes a strip body having two end portions which are opposite to and overlapped with each other so that an adjustable accommodation space is defined by the two end portions, and the two end portions respectively includes a first toothed rack and a second toothed rack. The cable management module includes a cable-loading portion and a third toothed rack disposed on the cable-loading portion, and the cable-loading portion configured to retain the cable to be curved thereon. The driving rotation shaft set includes a first gear member, a second gear member and a rotary shaft body coaxially coupled to the first gear member and the second gear member, and the first gear member is engaged with the first toothed rack and the second toothed rack. The adjustment gear set is linkably engaged with the second gear member and the third toothed rack. The rotary adjusting assembly is coaxially connected to the rotary shaft body. When the rotary shaft body is rotated by the rotary adjusting assembly, the first gear member moves the two end portions of the strip body to travel in opposite directions so as to adjust a size of the adjustable accommodation space, and the second gear member moves the cable-loading portion through the adjustment gear set so as to adjust a length of one portion of the cable between the display and the cable management module. The amount of movement of the cable-loading portion is less than the amount of movement of the two end portions of the strip body travelled in opposite directions.

With the structure described in the above embodiments, the headband adjustment structure not only can shortens the adjustment time to the headband of the headset electronic device, but also reduce the chance of the cable of the display interfering the user, thereby increasing the willingness of the user to use the headband adjustment structure.

The above description is merely used for illustrating the problems to be resolved, the technical methods for resolving the problems and their efficacies, etc. The specific details of the disclosure will be explained in the embodiments below and related drawings.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure. In the drawings.

DESCRIPTION OF THE EMBODIMENTS

Figure 1:
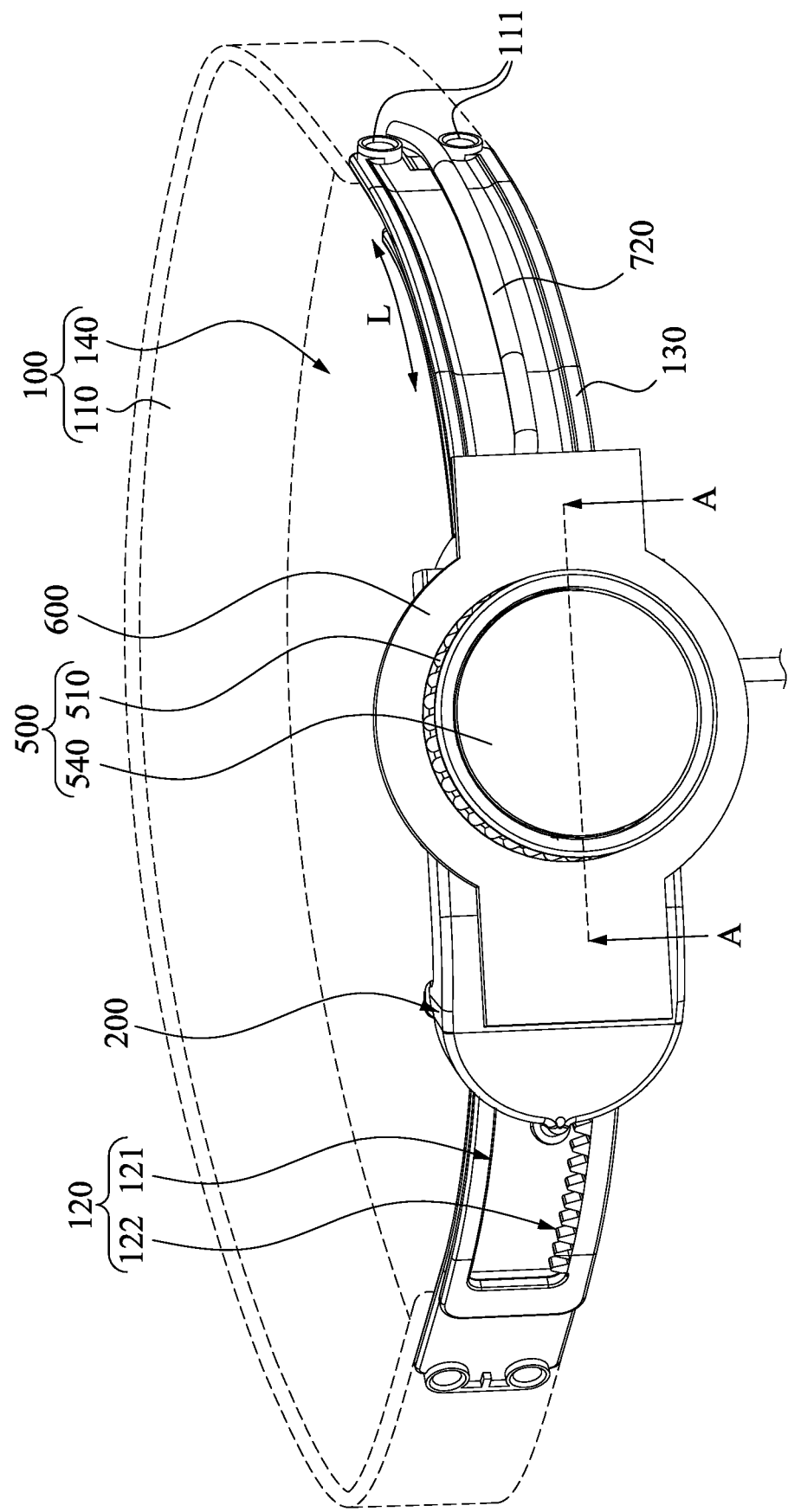
FIG. 1 is a perspective view of a headband adjustment structure according to one embodiment of the disclosure.

Reference will now be made in detail to the present embodiments of the disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the disclosure without departing from the scope or spirit of the disclosure.

Figure 2:
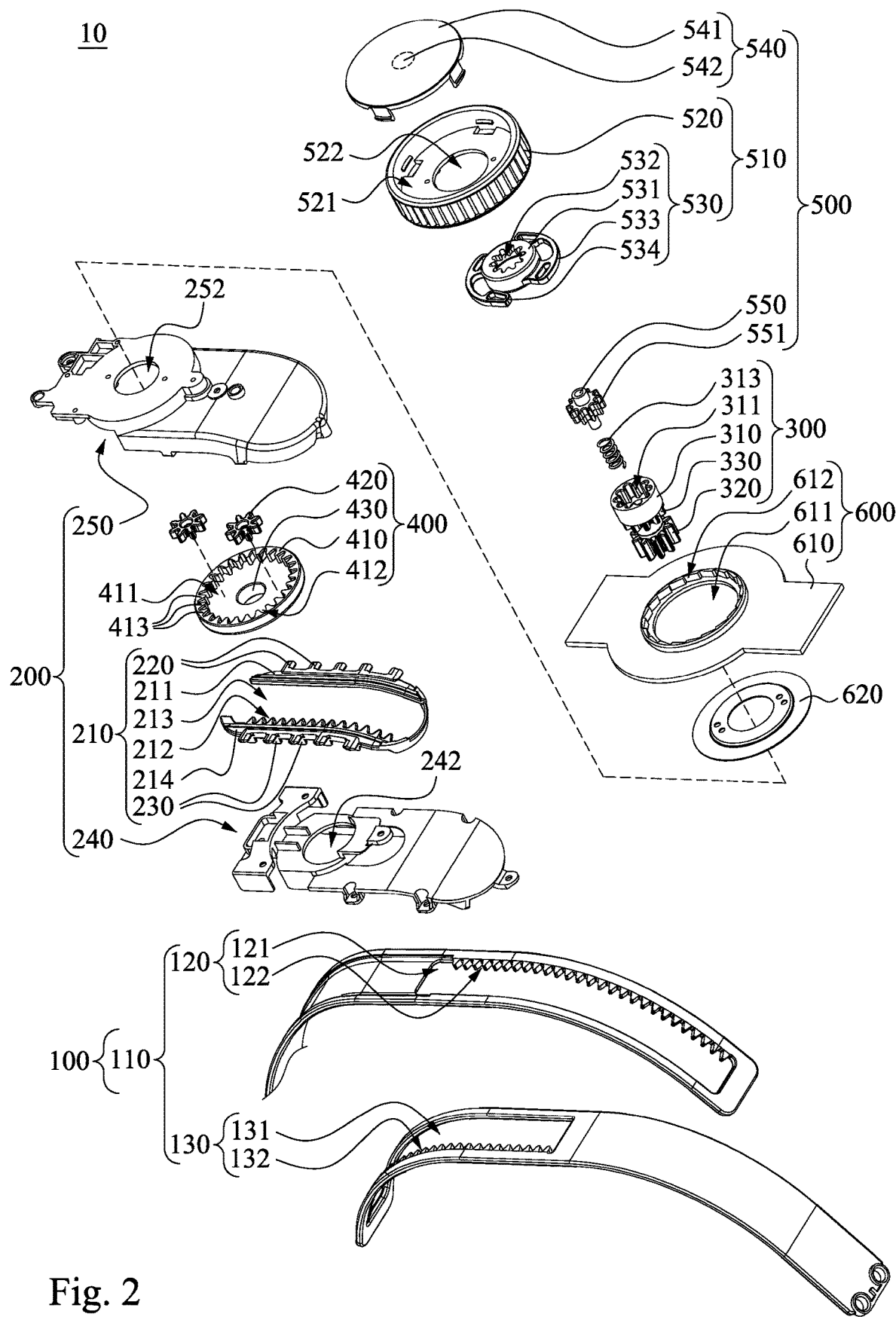
FIG. 2 is an exploded view of the headband adjustment structure of FIG. 1.
Figure 3:
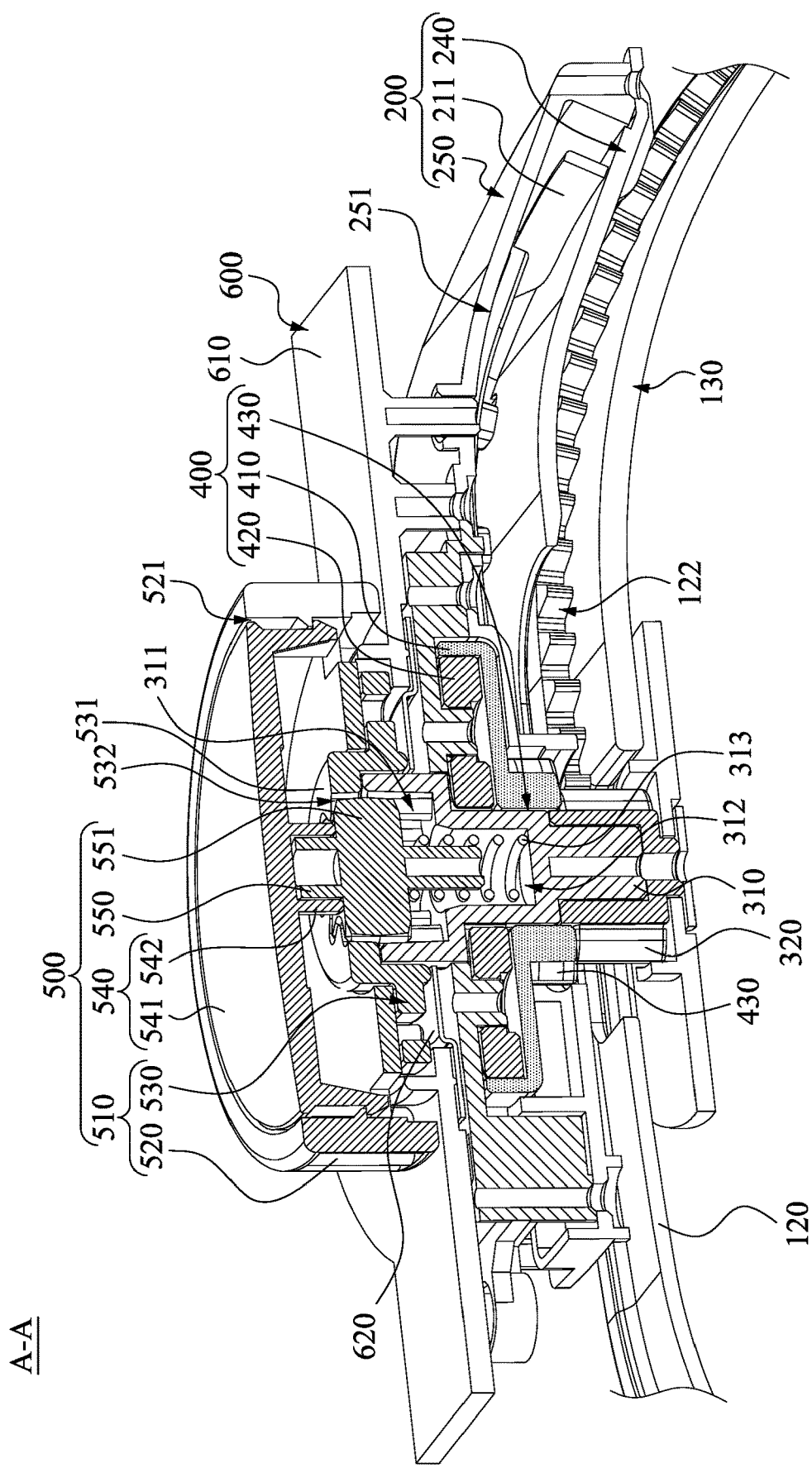
FIG. 3 is a cross-sectional view of the headband adjustment structure of FIG. 1 taken along a line AA.
Figure 4:
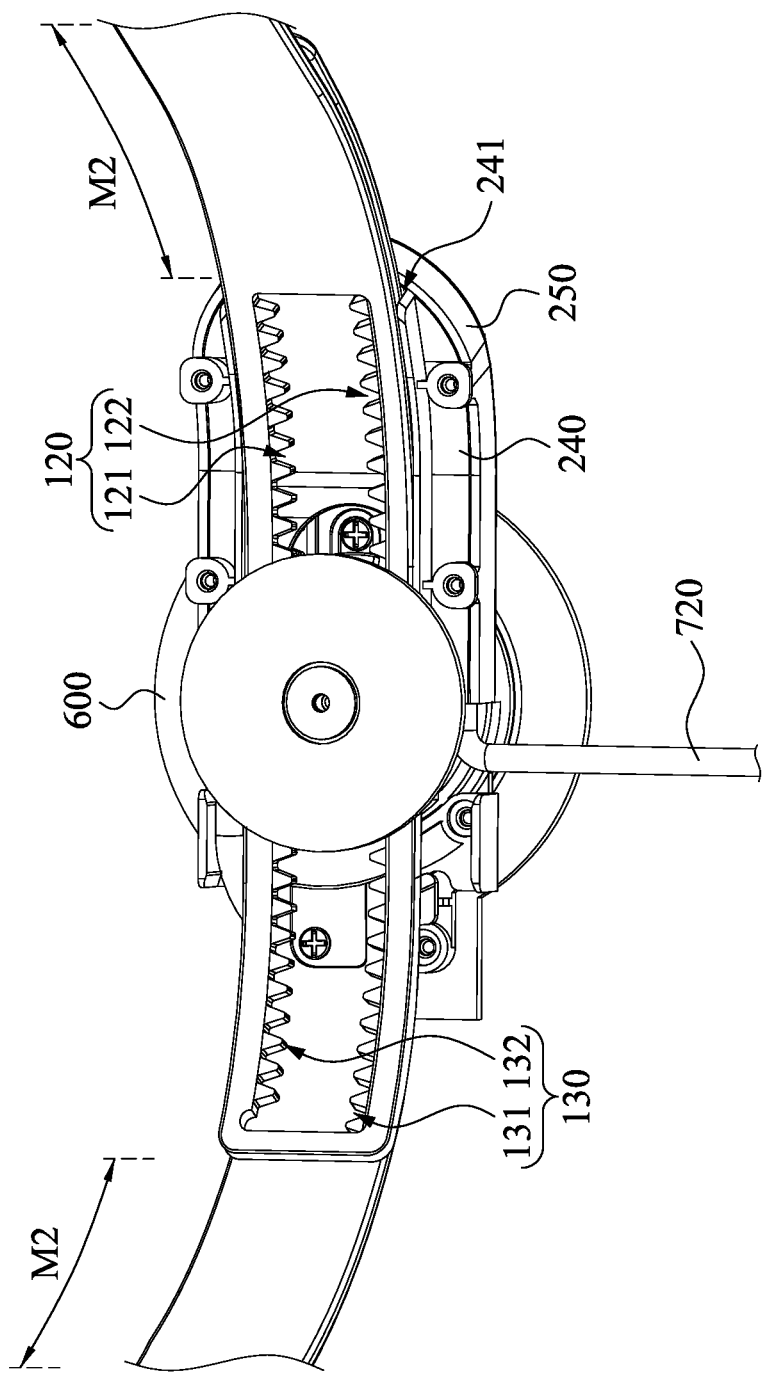
FIG. 4 is a schematic view of the rotary adjusting assembly of FIG. 3 after being rotated.

Reference is now made to FIG. 1, in which FIG. 1 is a perspective view of a headband adjustment structure 10 according to one embodiment of the disclosure, FIG. 2 is an exploded view of the headband adjustment structure 10 of FIG. 1, FIG. 3 is a cross-sectional view of the headband adjustment structure 10 of FIG. 1 taken along a line AA, and FIG. 4 is a schematic view of the rotary adjusting assembly 500 of FIG. 3 after being rotated. As shown in FIG. 1 to FIG. 3, the headband adjustment structure 10 includes a wearing unit 100, a cable management module 200, a driving rotation shaft set 300, an adjustment gear set 400 and a rotary adjusting assembly 500. The wearing unit 100 has an adjustable accommodation space 140. The size of the adjustable accommodation space 140 is adjustable so as to be matchingly worn on a user's head H. The cable management module 200 is located between the wearing unit 100 and the rotary adjusting assembly 500 for carrying at least one cable 720. The adjustment gear set 400 is linkably coupled to the cable management module 200. The driving rotation shaft set 300 passes through the wearing unit 100 and the cable management module 200, and the driving rotation shaft set 300 is linkably coupled to the wearing unit 100 and the adjustment gear set 400 and is coaxially connected to the rotary adjusting assembly 500.

Accordingly, as shown in FIG. 2 and FIG. 4, when a user rotates the driving rotation shaft set 300 by rotating the rotary adjusting assembly 500, the driving rotation shaft set 300 is able to drive the wearing unit 100 synchronously for adjusting the size of the adjustable accommodation space 140, and move the cable management module 200 through the adjustment gear set 400 so as to draw or release the cable 720 on the cable management module 200. On the other hand, when the user stops rotating the rotary adjusting assembly 500 to enable the headband adjustment structure 10 into a stationary state, the driving rotation shaft set 300 being stopped still securely keeps the present adjustable accommodation space 140 of the wearing unit 100 and the length of a part of the cable 720 which is retained on the cable management module 200. Thus, with the structure described in the above embodiment, the adjustment time of the headband adjustment structure 10 being worn on a user can be shortened so as to increase the willingness of the user to use the headband adjustment structure.

In specific, as shown in FIG. 2 to FIG. 4, the wearing unit 100 includes a strip body 110. The strip body 110 is bendy, and is provided with a first end portion 120 and a second end portion 130 which are opposite to each other. The first end portion 120 and the second end portion 130 are overlapped with each other so as to surround to define the aforementioned adjustable accommodation space 140 inside the strip body 110. One end of the driving rotation shaft set 300 is coaxially coupled to the rotary adjusting assembly 500, the other end of the driving rotation shaft set 300 sequentially passes through the adjustment gear set 400, the cable management module 200 and the overlapping portion of the strip body 110.

More specifically, the first end portion 120 of the strip body 110 includes a first elongated hole 121 and a first toothed rack 122. The first elongated hole 121 is formed on the first end portion 120 of the strip body 110 and penetrates through the first end portion 120 of the strip body 110, and the first toothed rack 122 is located at one long side edge of the first elongated hole 121. The second end portion 130 of the strip body 110 includes a second elongated hole 131 and a second toothed rack 132. The second elongated hole 131 is formed on the second end portion 130 of the strip body 110 and penetrates through the second end portion 130 of the strip body 110, and the second toothed rack 132 is located at one long side edge of the second elongated hole 131. Since the first end portion 120 and the second end portion 130 are overlapped with each other, the first elongated hole 121 and the second elongated hole 131 are aligned to and overlapped with each other.

The driving rotation shaft set 300 includes a rotary shaft body 310, a first gear member 320 and a second gear member 330. The rotary shaft body 310 coaxially passes through the first elongated hole 121 and the second elongated hole 131, and the rotary shaft body 310 is coaxially coupled to the first gear member 320, the second gear member 330 and the rotary adjusting assembly 500. The first gear member 320 is disposed between the first toothed rack 122 and the second toothed rack 132 to mutually engage with the first toothed rack 122 and the second toothed rack 132. The rolling of the first gear member 320 moves the first end portion 120 and the second end portion 130 to reversely travel in opposite directions so as to enlarge or minify the size of the adjustable accommodation space 140. The cable management module 200 includes a cable-loading portion 210 for loading the cable 720. The cable-loading portion 210 is slidably disposed between the wearing unit 100 and the rotary adjusting assembly 500. The cable-loading portion 210 includes a third toothed rack 212. The adjustment gear set 400 is engaged with the second gear member 330 and the third toothed rack 212.

Thus, when the user rotates the driving rotation shaft set 300 by rotating the rotary adjusting assembly 500, the first gear member 320 reversely moves the first end portion 120 and the second end portion 130 in opposite directions with the rotation of the rotary adjusting assembly 500, and the second gear member 330 laterally moves the cable-loading portion 210 with the rotation of the rotary adjusting assembly 500 through the adjustment gear set 400 so as to synchronously adjust the length of the wearing unit 100 and the length of the cable 720 on the cable management module 200.

It is noted, since the first gear member 320 and the second gear member 330 are the same in number, thus, when the driving rotation shaft set 300 is rotated, the turn number of the first gear member 320 rotating along the first toothed rack 122 and the second toothed rack 132 is the same as the turn number of the adjustment gear set 400 being rotated by the second gear member 330. However, after the driving rotation shaft set 300 is rotated, the amount of movement of the cable management module 200 can be arranged to be different from the amount of movement of the wearing unit 100 through the adjustment of the turn number of the adjustment gear set 400 for meeting a specific purpose.

As shown in FIG. 1 to FIG. 3, the rotary adjusting assembly 500 includes a rotary button 510, a pressing button 540, a linkage member 550 and a position-limiting portion 551. The rotary button 510 is formed with a first engagement slot 532. The pressing button 540 is elevatably disposed on the rotary button 510, and covers the first engagement slot 532. The linkage member 550 is connected to the driving rotation shaft set 300 and the pressing button 540. The position-limiting portion 551 surrounds the linkage member 550 to be removably engaged within the first engagement slot 532. The position-limiting portion 551 is provided with a common axis line C with the first engagement slot 532 and the driving rotation shaft set 300, so that the driving rotation shaft set 300 can be rotated by the rotary button 510 through the position-limiting portion 551.

Specifically, the rotary button 510 includes a rotary knob 520 and an attaching member 530. One surface of the rotary knob 520 is formed with a concave portion 521 having an installation hole 522 located at a bottom surface thereof. The attaching member 530 is fixed on the other surface of the rotary knob 520. The attaching member 530 is formed with a protruding portion 531 at a center location thereof, and the first engagement slot 532 is formed on one end surface of the protruding portion 531. The protruding portion 531 extends into the concave portion 521 through the installation hole 522 such that the first engagement slot 532 is located within the concave portion 521. The pressing button 540 is elevatably disposed on a key cap 541 located within the concave portion 521, and an inner surface of the key cap 541 is formed with a connection portion 542. One end of the linkage member 550 located in the concave portion 521 is sleeved to the connection portion 542. The shape of the position-limiting portion 551 and the shape of the first engagement slot 532 are matched to each other, so that the position-limiting portion 551 can be fitted into the first engagement slot 532. For example, the position-limiting portion 551 is an external gear structure, and the first engagement slot 532 is an internal gear structure that matchingly engages with the external gear structure, however, the disclosure is not limited thereto.

Also, the driving rotation shaft set 300 further includes a second engagement slot 311, a passage 312 (FIG. 2) and an elastic element 313. The second engagement slot 311 is concavely formed on one end surface of the rotary shaft body 310 to accommodate the position-limiting portion 551 therein. The position-limiting portion 551 is engaged within the second engagement slot 311, and the second gear member 330 is disposed between the second engagement slot 311 and the first gear member 320. Specifically, the shape of the position-limiting portion 551 and the shape of the second engagement slot 311 are matched with each other so that the position-limiting portion 551 is able to matchingly insert into the second engagement slot 311. For example, the position-limiting portion 551 is an external gear structure, and the second engagement slot 311 is an internal gear structure that matchingly engages with the external gear structure, however, the disclosure is not limited thereto. The passage 312 is disposed on a bottom surface of the second engagement slot 311, and is in communication with the second engagement slot 311. The elastic element 313 is located within the passage 312 and the second engagement slot 311 to abut against the rotary shaft body 310 and one end of the linkage member 550 opposite to the pressing button 540 for pushing the position-limiting portion 551 back to the first engagement slot 532.

Thus, since the position-limiting portion 551 is engaged in both of the first engagement slot 532 and the second engagement slot 311 at the same time, when the user rotates the driving rotation shaft set 300 by rotating the rotary adjusting assembly 500, the rotary adjusting assembly 500 rotates the driving rotation shaft set 300 through the position-limiting portion 551 such that the first gear member 320 and the second gear member 330 are rotated synchronously with the rotation of the rotary adjusting assembly 500.

Figure 5:
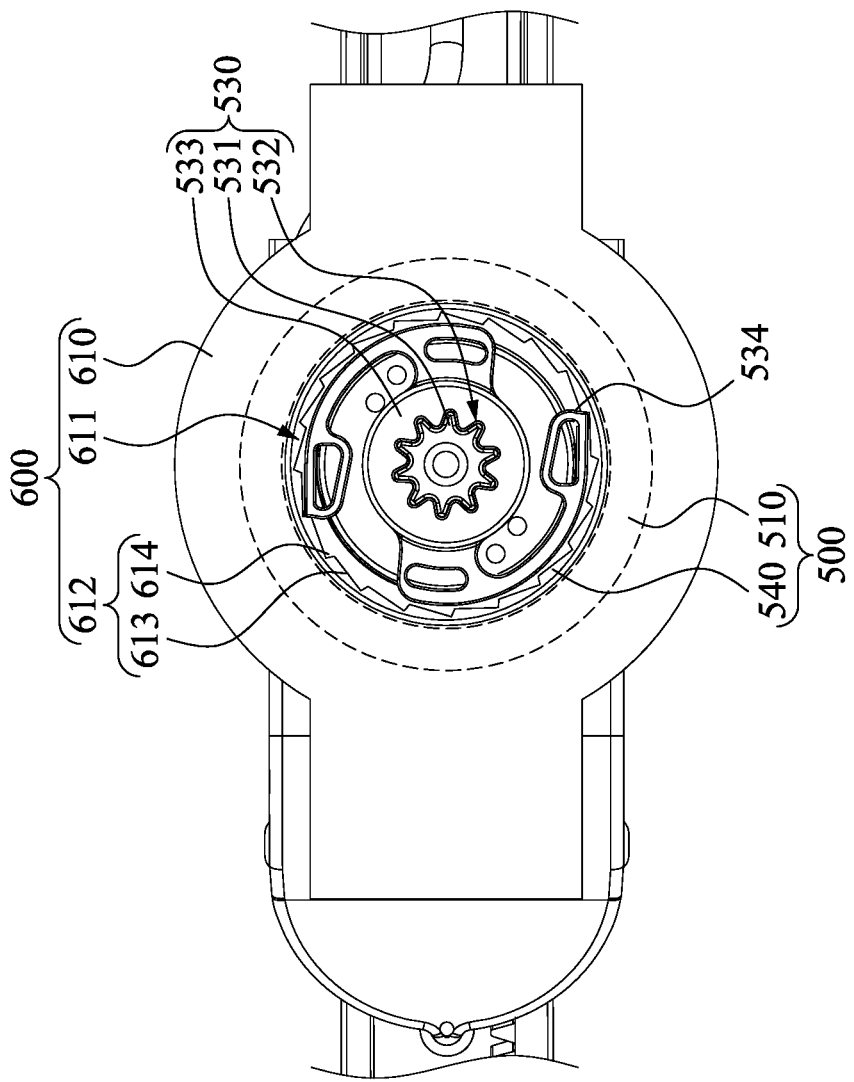
FIG. 5 is a see-through view of the rotary adjusting assembly of FIG. 1 on the foundation.

On the contrary, FIG. 5 is a see-through view of the rotary adjusting assembly 500 of FIG. 1 on the foundation 600. As shown in FIG. 3 and FIG. 5, when the user presses the pressing button 540 to completely move the position-limiting portion 551 out of the first engagement slot 532, since the first engagement slot 532 is not directly contacted with the position-limiting portion 551, the rotary button 510 cannot rotate the driving rotation shaft set 300 through the position-limiting portion 551, that is, the rotary button 510 only can be idly rotatable relative to the driving rotation shaft set 300 independently. Therefore, since the first engagement slot 532 is not engaged with the position-limiting portion 551, the first gear member 320 is not able to fix the positions of the first end portion 120 and the second end portion 130, and the second gear member 330 is not able to fix the positions of the cable-loading portion 210. Thus, the user can directly pull the strip body 110 placed at the first end portion 120 or the second end portion 130, or directly pull the cable 720 so as to quickly adjust the wearing unit 100 and the cable 720.

Figure 6:
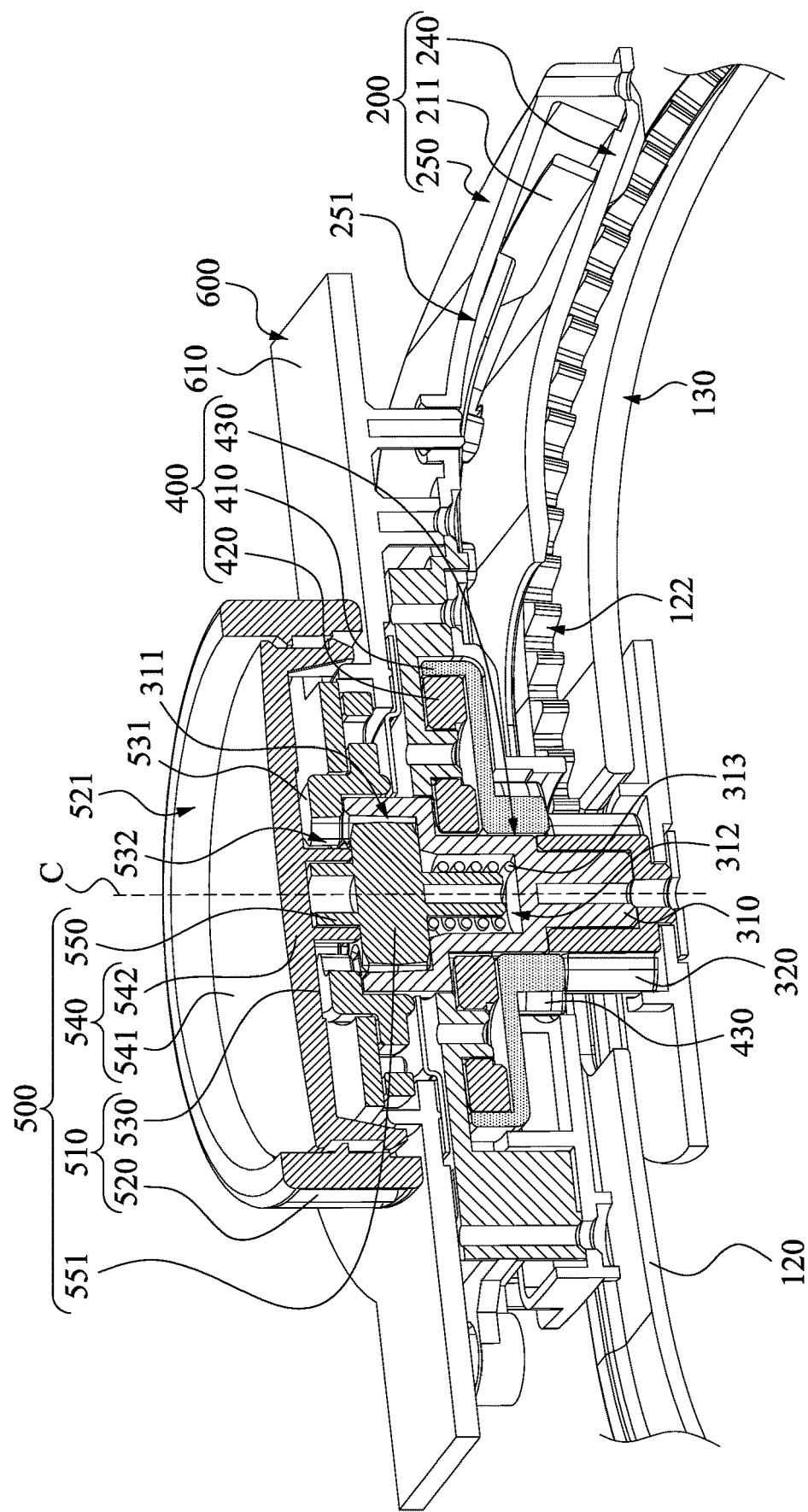
FIG. 6 is a schematic cross-sectional view of the rotary adjusting assembly of FIG. 3 after being pressed.

FIG. 6 is a schematic cross-sectional view of the rotary adjusting assembly 500 of FIG. 3 after being pressed. As shown in FIG. 2, FIG. 3 and FIG. 6, the headband adjustment structure 10 further includes a foundation 600 disposed between the cable management module 200 and the rotary adjusting assembly 500. The foundation 600 includes a base 610, a sunken portion 611 and a plurality of ratchet teeth 612. The base 610 is fixedly disposed on the cable management module 200. For example, the base 610 is fixedly coupled to the cable management module 200 by bolt screwing. The sunken portion 611 is located on one surface of the base 610 opposite to the cable management module 200. The ratchet teeth 612 are arranged equally spaced on the inner wall of the sunken portion 611. Each of the ratchet teeth 612 is provided with a contacting slope 613 and a stop surface 614, and each of the contacting slopes 613 is in contact with the adjacent two of the stop surfaces 614, respectively. The attaching member 530 of the rotary adjusting assembly 500 is rotatably disposed in the sunken portion 611. The attaching member 530 includes two elastic contacting ribs 533. The elastic contacting ribs 533 are oppositely disposed on the outer edge of the attaching member 530 opposite to the protruding portion 531, and respectively extend outwardly. One distal end of each of the elastic contacting ribs 533 being opposite to the attaching member 530 which is a free end 534 is in physical contact against one of the contacting slopes 613 of the ratchet teeth 612, and is stopped by the adjacent one of the stop surfaces 614 so as to limit the rotation direction of the rotary adjusting assembly 500.

Therefore, when the user rotates the rotary adjusting assembly 500, the elastic contacting ribs 533 being pressed down can be sequentially released to hit the subsequent contacting slopes 613 in order. Therefore, by producing continuous hitting sounds outwardly and transmitting dotted vibrations to the user's hand, the user can be assisted for adjusting the wearing unit 100 and the cable management module 200 during the rotation.

Also, refer to FIG. 2 and FIG. 3, the headband adjustment structure 10 further includes a load plate 620. The load plate 620 is interposed between the cable management module 200 and the rotary adjusting assembly 500, and the load plate 620 is fixedly to the rotary knob 520 through the sunken portion 611 at one surface of the foundation 600 opposite to the rotary adjusting assembly 500 so that the foundation 600 is sandwiched between the load plate 620 and the rotary button 510.

Figure 7:
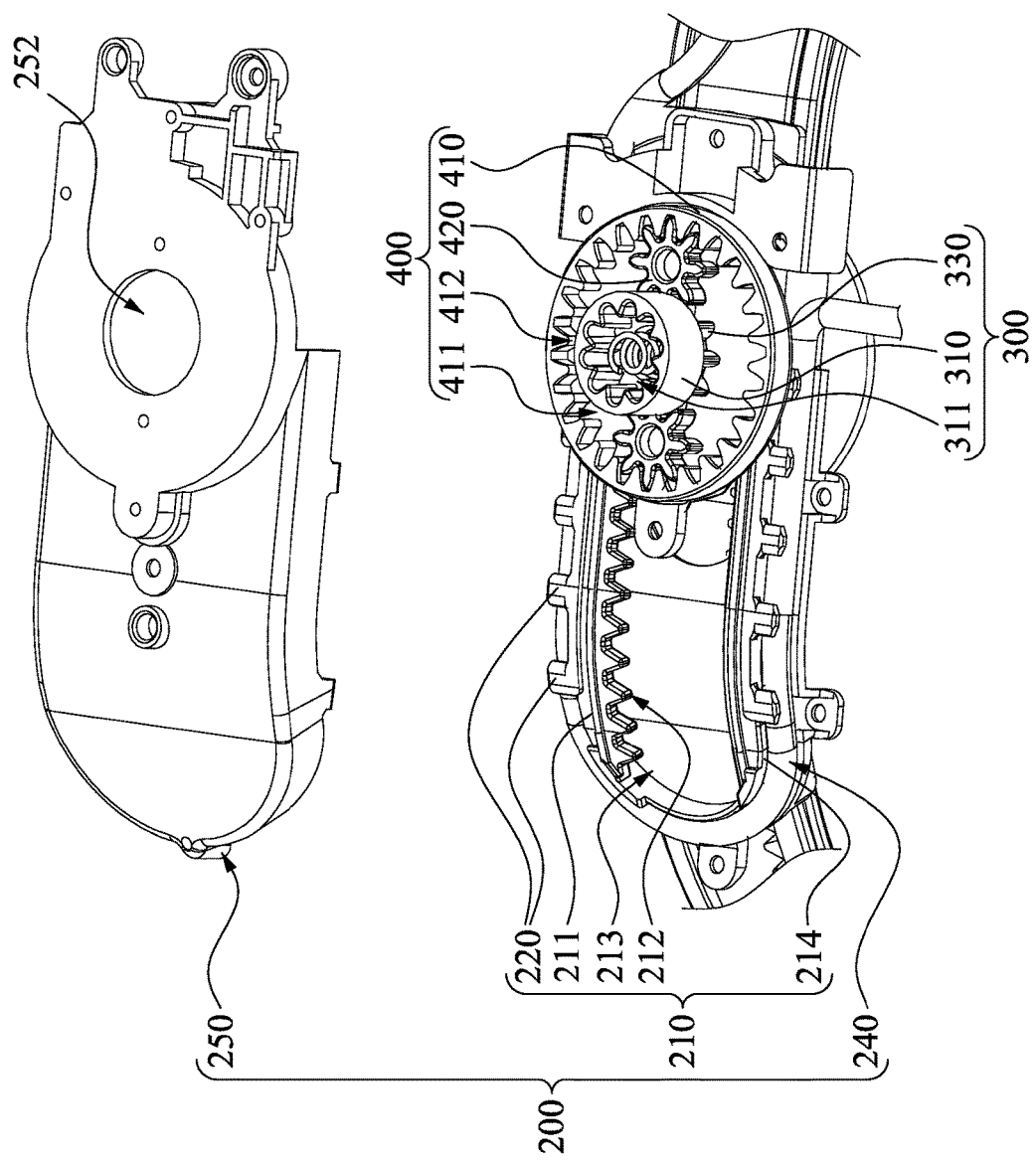
FIG. 7 is a connecting relationship view of the driving rotation shaft set and the adjustment gear set of FIG. 1.
Figure 8:
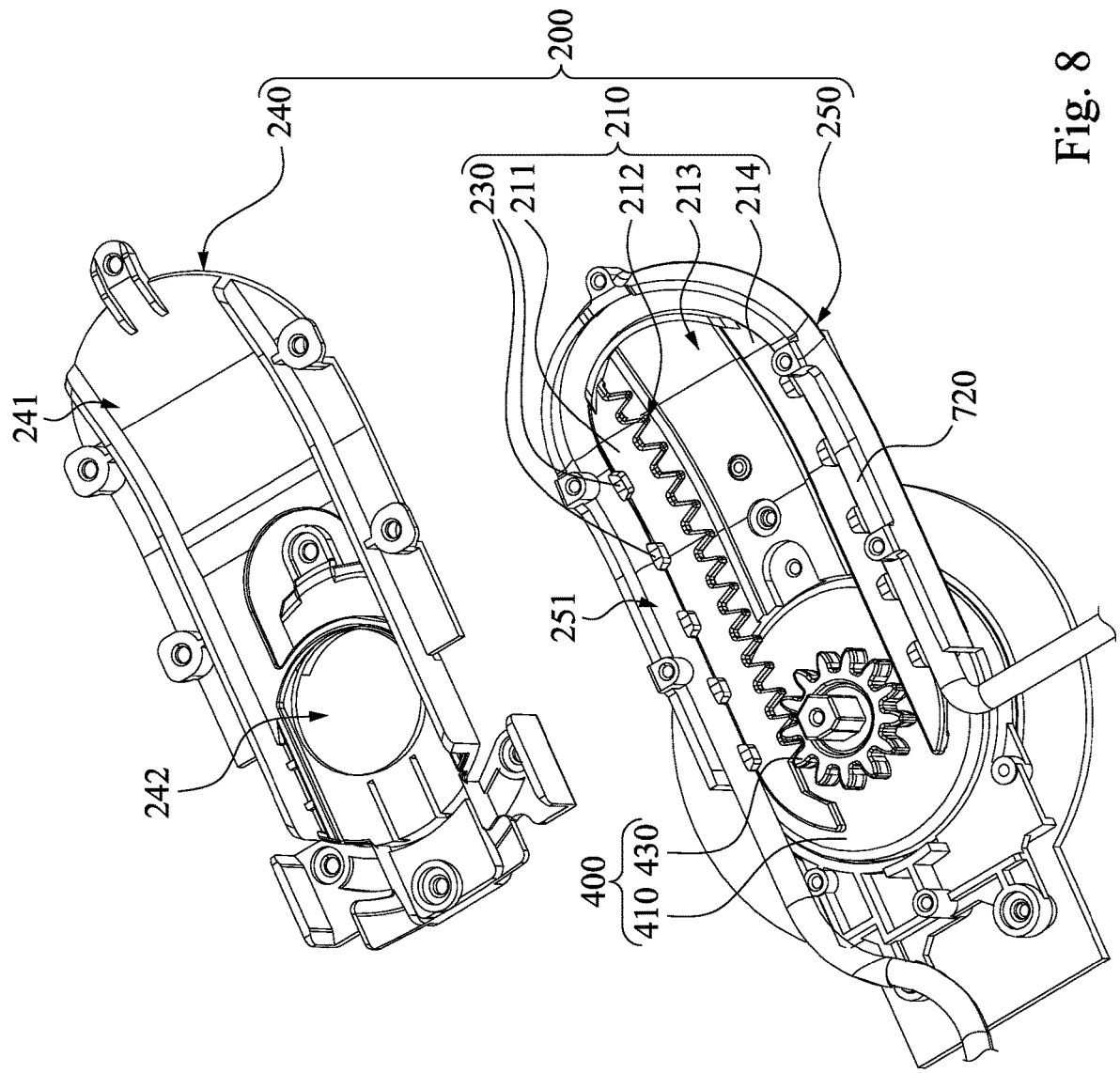
FIG. 8 is a connecting relationship viewed towards an opposite direction of FIG. 7.
Figure 9:
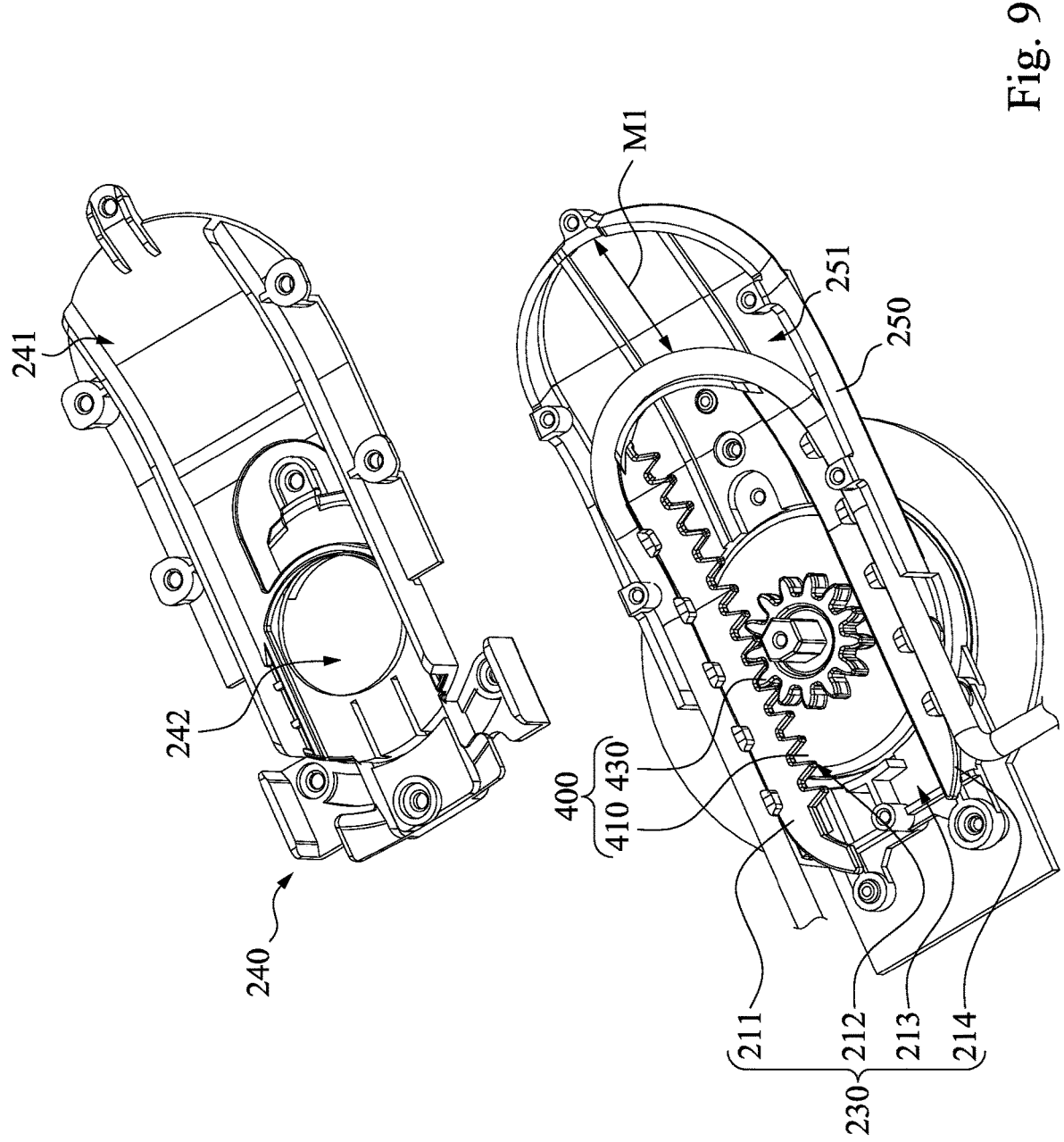
FIG. 9 is a schematic operational view of the cable-loading portion of FIG. 8 after being moved.

Reference is now made to FIG. 7, FIG. 8 and FIG. 9 in which FIG. 7 is a connecting relationship view of the driving rotation shaft set 300 and the adjustment gear set 400 of FIG. 1, FIG. 8 is a connecting relationship viewed towards an opposite direction of FIG. 7, and FIG. 9 is a schematic operational view of the cable-loading portion 210 of FIG. 8 after being moved. As shown in FIG. 2, FIG. 7 and FIG. 8, the adjustment gear set 400 includes a rotary plate 410, an internal gear portion 412, two epicyclic gearing portions 420 and an external gear portion 430. The rotary plate 410 has a circular recess 411 which is formed on one surface of the rotary plate 410. The second gear member 330 is located within the circular recess 411, and located between the epicyclic gearing portions 420, and engaged with the epicyclic gearing portions 420 respectively. The internal gear portion 412 is located on an inner sidewall of the circular recess 411. The internal gear portion 412 is located on an inner sidewall of the circular recess 411. The internal gear portion 412 includes a plurality of teeth 413 that are continuously arranged on the inner sidewall of the circular recess 411. The epicyclic gearing portions 420 are received within the circular recess 411, located between the internal gear portion 412 and the second gear member 330, and to be engaged with the internal gear portion 412 and the second gear member 330, respectively. The external gear portion 430 is located on one surface of the rotary plate 410 being opposite the circular recess 411, and engaged with the third toothed rack 212. Thus, when the user rotates the driving rotation shaft set 300, the second gear member 330 rotates the epicyclic gearing portions 420 and the internal gear portion 412 simultaneously, so as to push the third toothed rack 212 by rotating the external gear portion 430, so that the cable-loading portion 210 can be linkably slid in the cable management module 200 so as to move the cable 720.

It is noted, the gear number of the first gear member 320 is the same as the gear number of the second gear member 330, and is greater than the gear number of each of the epicyclic gearing portions 420, so that the amount of the movement M1 of the cable-loading portion 210 is less than the amount of the movement M2 of the first end portion 120 or the second end portion 130. For example, the amount of movement of the strip body 110 is twice the amount of movement of the cable-loading portion 210.

As shown in FIG. 2, FIG. 8 and FIG. 9, the cable management module 200 includes a bottom cover 240 and a top cover 250. The bottom cover 240 is disposed between the top cover 250 and the strip body 110. The bottom cover 240 is formed with a receiving groove 241 on one side of the bottom cover 240 so that the portions of the first end portion 120 and the second end portion 130 which are overlapped with each other are received within the receiving groove 241. The top cover 250 is disposed between the rotary adjusting assembly 500 and the strip body 110, and the top cover 250 is covered on the bottom cover 240 so that an inner space 251 is defined between the bottom cover 240 and the top cover 250 (FIG. 6). The adjustment gear set 400 is rotatably disposed within the inner space 251, and the cable-loading portion 210 is slidably disposed between the bottom cover 240 and the adjustment gear set 400. The top cover 250 is formed with a first penetration hole 252, and the first penetration hole 252 is in communication with the inner space 251 so as to allow the rotary shaft body 310 to pass through the first penetration hole 252. The bottom cover 240 is formed with a second penetration hole 242, and the second penetration hole 242 is in communication with the inner space 251 so as to allow the first gear member 320 to pass through the second penetration hole 242.

Figure 10:
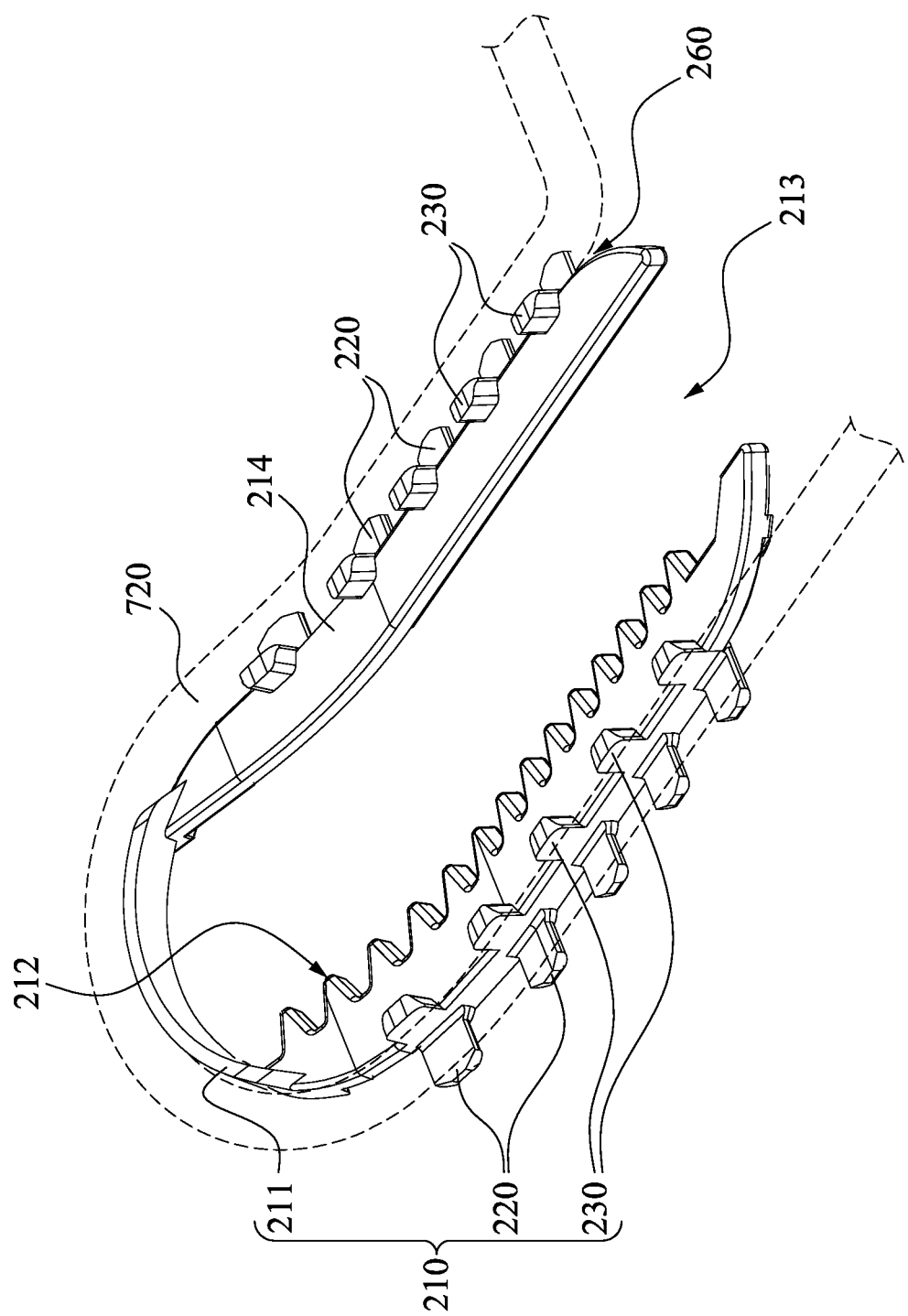
FIG. 10 is a connecting relationship view of the cable-loading portion and the cable of FIG. 1.

FIG. 10 is a connecting relationship view of the cable-loading portion 210 and the cable 720 of FIG. 1. As shown in FIG. 10, the cable-loading portion 210 includes a frame 211 having a U-shape, a plurality of first support ribs 220 and a plurality of second support ribs 230. The U-shape of the frame 211 is provided with a long notch 213 and an outer edge 214 being arranged opposite to the long notch 213. The third toothed rack 212 is located at an inner edge of the long notch 213. The cable 720 is curvedly retained on the outer edge 214 of the cable-loading portion 210. The first support ribs 220 are spaced arranged on the outer edge 214 of the frame 211, and respectively extend away from the long notch 213. The second support ribs 230 are arranged on one surface of the frame 211 being opposite to the top cover 250 (or the rotary adjusting assembly 500), and respectively extend towards bottom cover 240 (or the wearing unit 100). Thus, a cable receiving area for retaining the cable 720 is defined collectively by the bottom cover 240, the first supporting ribs 220 and the second supporting ribs 230 together.

Figure 11:
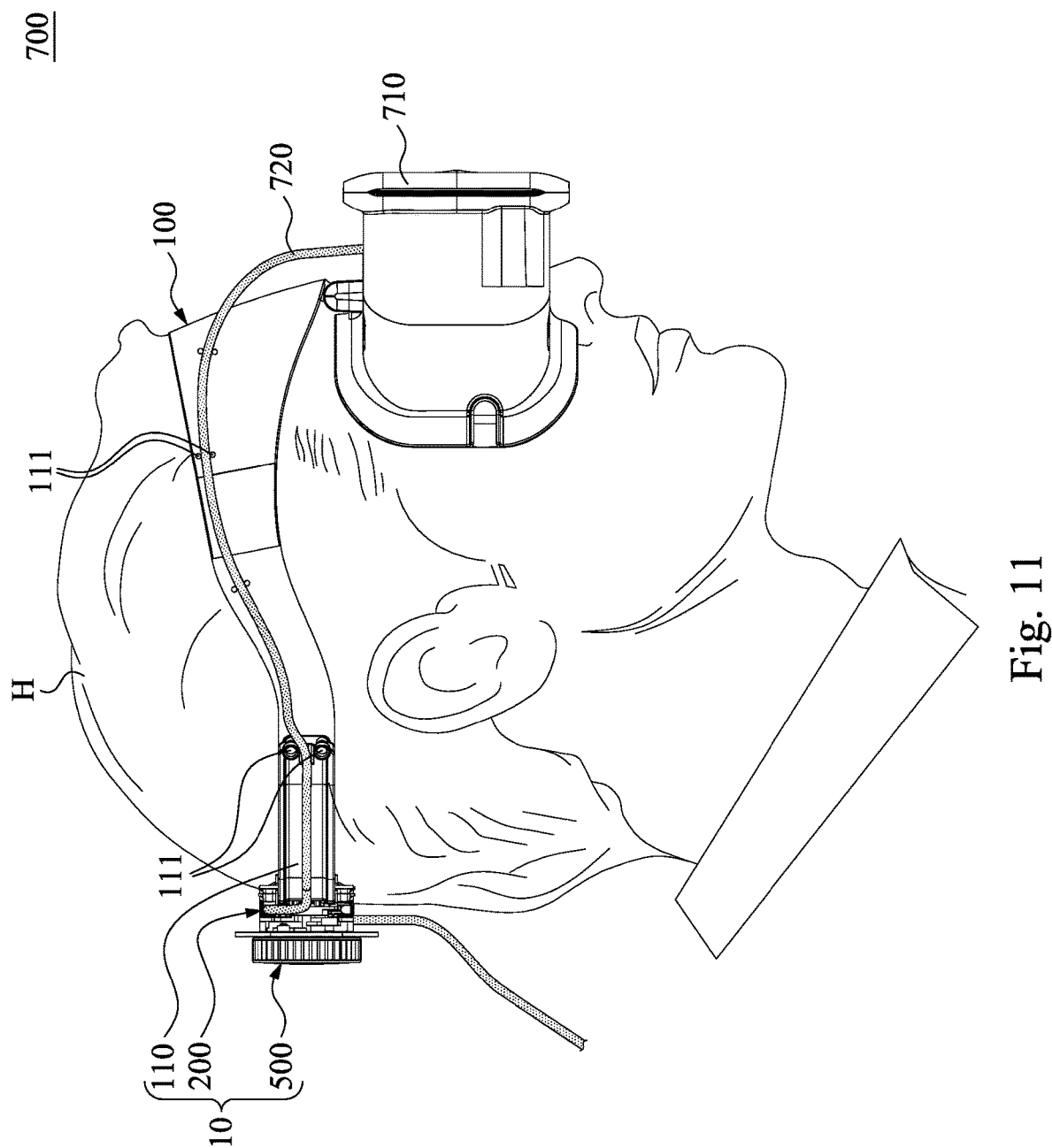
FIG. 11 is a side view of a headset electronic device according to one embodiment of the disclosure.

FIG. 11 is a side view of a headset electronic device 700 according to one embodiment of the disclosure. As shown in FIG. 3 and FIG. 11, the headset electronic device 700 includes a display 710, a cable 720 (e.g., electrical cable) and the aforementioned headband adjustment structure 10. One end of the cable 720 (e.g., electrical cable) is electrically connected to the display 710, the other end of the cable 720 extends to a mainframe system (not shown in figures). The display 710 is connected to one side of the wearing unit 100 of the aforementioned headband adjustment structure 10 being away from the rotary adjusting assembly 500. Thus, when a user rotates the driving rotation shaft set 300 by rotating the rotary adjusting assembly 500, the first gear member 320 drives the first end portion 120 and the second end portion 130 of the strip body 110 to travel in opposite directions from each other so as to adjust the size of the adjustable accommodation space 140, and the second gear member 330 laterally moves the cable-loading portion 210 through the adjustment gear set 400 so as to adjust the line length between the display 710 and the cable management module 200.

It is noted, since the amount M2 of the movement of the cable-loading portion 210 is less than the amount M1 of the movement of the first end portion 120 and the second end portion 130 of the strip body 110 travelled in opposite directions from each other, that is, the degree that the cable 720 is tightened is less than the degree that the wearing unit 100 is retracted or expanded. Therefore, the cable 720 (e.g., electrical cable) located at the cable-loading portion 210 will be excessively tightened so as to avoid a decrease in the life of the cable 720.

However, the disclosure is not limited thereto, in other embodiments, one with ordinary skill in the art of the disclosure also is not limited to modify the amount of the movement of the cable-loading portion to equal to the amount of the movement of the two end portions of the strip body travelled in opposite directions.

In addition, as shown in FIG. 1 and FIG. 11, the strip body 110 is provided with a cable-retaining portion 111. The cable-retaining portion 111 is used to enable the cable 720 to attach on the outer surface of the strip body 110 along a longitudinal direction L of the strip body 110. Since the cable 720 is attached on the outer surface of the strip body 110 along the longitudinal direction L of the strip body 110, and extends outwards from one side of the headband adjustment structure 10 opposite to the display 710. Thus, the chance of the cable of the display 710 to interfere the user can be reduced so as to increase the willingness of the user to use the headband adjustment structure.

Although the disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A headband adjustment structure, comprising:
   a rotary adjusting assembly;
   a wearing unit comprising a strip body having two end portions which are opposite to and overlapped with each other, wherein the strip body surrounds to define an adjustable accommodation space inside the strip body, and the two end portions respectively comprise a first toothed rack and a second toothed rack;
   a cable management module located between the wearing unit and the rotary adjusting assembly for carrying at least one cable;

an adjustment gear set linkably coupled to the cable management module; and a driving rotation shaft set passing through the wearing unit and the cable management module, and linkably coupled to the wearing unit and the adjustment gear set, and coaxially connected to the rotary adjusting assembly, and the driving rotation shaft set comprising a first gear member, a second gear member, and a rotary shaft body coaxially coupled to the first gear member and the second gear member, and the first gear member being engaged with the first toothed rack and the second toothed rack, wherein, when the rotary adjusting assembly rotates the driving rotation shaft set, the first pear member moves the two end portions of the strip body to travel in opposite directions so as to adjust a size of the adjustable accommodation space and moves the cable management module through the adjustment gear set in which an amount of movement of the cable management module is different from an amount of movement of the wearing unit.

2. The headband adjustment structure of claim 1, wherein the rotary adjusting assembly comprises:

a rotary button having a first engagement slot;

a pressing button elevatably disposed on the rotary button, and covering the first engagement slot;

a linkage member connected to the driving rotation shaft set and the pressing button; and a position-limiting portion surrounding the linkage member to be removably engaged within the first engagement slot, and provided with a common axis line with the first engagement slot and the driving rotation shaft set, so that the rotary button is able to move the driving rotation shaft set to rotate through the position-limiting portion, wherein, when the position-limiting portion is moved away from the first engagement slot by pressing the pressing button, the rotary button is idly rotatable relative to the driving rotation shaft set.

3. The headband adjustment structure of claim 2, wherein the driving rotation shaft set further comprises:

a second engagement slot formed on one end surface of the rotary shaft body to accommodate the position-limiting portion therein, wherein the position-limiting portion is engaged within the second engagement slot, and the second gear member is disposed between the second engagement slot and the first gear member;

a passage disposed on a bottom surface of the second engagement slot, and being in communication with the second engagement slot; and an elastic element located within the passage and the second engagement slot to abut against the linkage member and the rotary shaft body for pushing the position-limiting portion back to the first engagement slot.

4. The headband adjustment structure of claim 1, wherein the cable management module comprises a cable-loading portion and a third toothed rack disposed on the cable-loading portion, and the cable-loading portion is configured to retain the cable to be curved thereon, wherein, when the rotary adjusting assembly moves the rotary shaft body to rotate collectively, the second gear member moves the cable-loading portion through the adjustment gear set.

5. The headband adjustment structure of claim 4, wherein the adjustment gear set comprises:

a rotary plate having a circular recess which is formed on one surface of the rotary plate, wherein the second gear member is located within the circular recess;

an internal gear portion located on an inner sidewall of the circular recess;

at least one epicyclic gearing portion located within the circular recess to be engaged with the second gear member and the internal gear portion; and an external gear portion located on one surface of the rotary plate being opposite the circular recess, and engaged with the third toothed rack.

6. The headband adjustment structure of claim 5, wherein the first gear member and the second gear member are the same in number, and the first gear member is greater than the at least one epicyclic gearing portion in number so that the amount of movement of the cable-loading portion is less than the amount of movement of the two end portions of the strip body traveling in the opposite directions.

7. The headband adjustment structure of claim 4, wherein the cable-loading portion comprises:

a frame having a U-shape which is provided with a long notch and an outer edge being arranged opposite to the long notch, wherein the third toothed rack is located at a side edge of the long notch;

a plurality of first support ribs spaced arranged on the outer edge of the frame, and respectively extending away from the long notch; and a plurality of second support ribs arranged on one surface of the frame being opposite to the rotary adjusting assembly, and respectively extending towards the wearing unit, wherein a cable receiving area for retaining the cable is defined collectively by the first supporting ribs and the second supporting ribs together.

8. The headband adjustment structure of claim 1, wherein the strip body is provided with a cable-retaining portion for attaching the cable to one surface of the strip body being opposite to the cable management module along a longitudinal direction of the strip body.

9. A headset electronic device, comprising:

a display;

a cable in which one end of the cable is connected to the display; and a headband adjustment structure, comprising:

a wearing unit connected to the display, and the wearing unit comprising a strip body having two end portions which are opposite to and overlapped with each other so that an adjustable accommodation space is defined by the two end portions, and the two end portions respectively comprises a first toothed rack and a second toothed rack;

a cable management module comprising a cable-loading portion and a third toothed rack disposed on the cable-loading portion, and the cable-loading portion configured to retain the cable to be curved thereon;

a driving rotation shaft set comprising a first gear member, a second gear member and a rotary shaft body coaxially coupled to the first gear member and the second gear member, and the first gear member is engaged with the first toothed rack and the second toothed rack;

an adjustment gear set linkably engaged with the second gear member and the third toothed rack; and a rotary adjusting assembly coaxially connected to the rotary shaft body, wherein, when the rotary shaft body is rotated by the rotary adjusting assembly, the first gear member moves the two end portions of the strip body to travel in opposite directions so as to adjust a size of the adjustable accommodation space, and the second gear member moves the cable-loading portion through the adjustment gear set so as to adjust a length of a portion of the cable between the display and the cable management module, wherein an amount of movement of the cable-loading portion is less than an amount of movement of the two end portions of the strip body travelled in opposite directions.

* * * * *